US009605722B2

(12) United States Patent
Saoyama et al.

(10) Patent No.: US 9,605,722 B2

(45) Date of Patent: Mar. 28, 2017

(54) ELECTRIC BRAKE ACTUATOR WITH PARKING FUNCTION

(71) Applicant: NTN CORPORATION, Osaka (JP)

(72) Inventors: Yuuki Saoyama, Iwata (JP); Makoto Muramatsu, Iwata (JP)

(73) Assignee: NTN CORPORATION, Osaka (JP)

(*) Notice: Subject to any disclaimer, the term of this patent is extended or adjusted under 35 U.S.C. 154(b) by 57 days.

(21) Appl. No.: 14/681,477

(22) Filed: Apr. 8, 2015

(65) Prior Publication Data

US 2015/0219172 A1 Aug. 6, 2015

Related U.S. Application Data

(63) Continuation of application No. PCT/JP2013/078167, filed on Oct. 17, 2013.

(30) Foreign Application Priority Data

Oct. 25, 2012 (JP) ................................ 2012-235295

(51) Int. Cl.

*F16D 65/14* (2006.01)
*F16D 65/18* (2006.01)

(Continued)

(52) U.S. Cl.

CPC ............ *F16D 65/14* (2013.01); *B60T 13/741* (2013.01); *F16D 65/18* (2013.01); *F16D 65/54* (2013.01);

(Continued)

(58) Field of Classification Search

CPC ...... F16D 65/14; F16D 65/18; F16D 2121/24; F16D 2121/20; F16D 2125/48;

(Continued)

(56) References Cited

U.S. PATENT DOCUMENTS 7,434,669 B2 10/2008 Halasy-Wimmer et al.
7,789,799 B2 9/2010 Shimizu et al.

(Continued)

FOREIGN PATENT DOCUMENTS

CN 1682039 A 10/2005
CN 101341054 A 1/2009

(Continued)

OTHER PUBLICATIONS

Japanese Notification of Reason(s) for Rejection dated May 31, 2016 in corresponding Japanese Patent Application No. 2013-235295.

(Continued)

*Primary Examiner* — Melanie Torres Williams

(57) ABSTRACT

The electric brake actuator with a parking function is provided with: detection unit which is provided in a vehicle in which the electric brake actuator is provided and is capable of detecting movement of the vehicle from a stop state; and determination unit configured to determine whether or not a locking mechanism has shifted to a parking locking state, by using a detection signal outputted from the detection unit, when the locking mechanism is driven by an actuator so as to switch from an unlocking state to the parking locking state.

6 Claims, 7 Drawing Sheets

17a
22
9
19
16
21
11
11a
18
13
14
1
12
15
4
2
17
17c
8
5
3
17b
20
10

(51) Int. Cl.

| | |
|---|---|
| ***F16D 65/54*** | (2006.01) |
| ***B60T 13/74*** | (2006.01) |
| *F16D 121/24* | (2012.01) |
| *F16D 127/06* | (2012.01) |
| *F16D 131/02* | (2012.01) |
| *F16D 125/48* | (2012.01) |

(52) U.S. Cl.
CPC ...... *F16D 2121/24* (2013.01); *F16D 2125/48* (2013.01); *F16D 2127/06* (2013.01); *F16D 2131/02* (2013.01)

(58) Field of Classification Search
CPC ............. F16D 2127/06; F16D 2131/02; B60T 13/761; B60T 1/005
USPC .................................................. 188/156–164
See application file for complete search history.

(56) References Cited

U.S. PATENT DOCUMENTS

| | | | |
|---|---|---|---|
| 7,850,255 | B2 | 12/2010 | Kawahara et al. |
| 2004/0040799 | A1* | 3/2004 | Schumann .............. B60T 7/107 188/158 |
| 2005/0258682 | A1 | 11/2005 | Halasy-Wimmer et al. |
| 2007/0114843 | A1* | 5/2007 | Kawahara ................. B60T 7/12 303/122 |
| 2007/0225117 | A1 | 9/2007 | Shimizu et al. |
| 2010/0051395 | A1* | 3/2010 | Sano ....................... B60T 1/005 188/162 |
| 2010/0090522 | A1 | 4/2010 | Bensch et al. |
| 2011/0139555 | A1* | 6/2011 | Hori ...................... B60T 13/741 188/72.1 |
| 2013/0186717 | A1* | 7/2013 | Muramatsu ........... F16D 55/226 188/72.1 |
| 2013/0231839 | A1 | 9/2013 | Baehrle-Miller et al. |
| 2014/0180535 | A1 | 6/2014 | Baehrle-Miller et al. |
| 2015/0041261 | A1 | 2/2015 | Masuda et al. |

FOREIGN PATENT DOCUMENTS

| | | | | | |
|---|---|---|---|---|---|
| CN | 101568454 | A | | 10/2009 | |
| DE | 10 2011 003 183 | | | 7/2012 | |
| EP | 1 787 882 | | | 5/2007 | |
| EP | 1 908 657 | A1 | | 4/2008 | |
| JP | 08-296677 | | | 11/1996 | |
| JP | 10-264792 | | | 10/1998 | |
| JP | 2005-343200 | | | 12/2005 | |
| JP | 2006-183809 | | | 7/2006 | |
| JP | 2009-085402 | | | 4/2009 | |
| JP | 2010054010 | A | * | 3/2010 | |
| JP | WO 2012124812 | A1 | * | 9/2012 | ............. F16D 65/18 |
| JP | 2013-226854 | | | 11/2013 | |
| WO | WO 2012/031803 | A1 | | 3/2012 | |

OTHER PUBLICATIONS

International Search Report mailed Jan. 14, 2014 in corresponding international application PCT/JP2013/078167.

PCT International Preliminary Report on Patentability dated May 7, 2015 in corresponding International Patent Application No. PCT/JP2013/078167.

Chinese Office Action dated Jun. 20, 2016 in corresponding Chinese Patent Application No. 201380054899.9.

Extended European Search Report dated Aug. 10, 2016 from European Patent Application No. 13848514.9, 6 pages.

* cited by examiner 9
19
16
21
11
11a
18
14
13
12
1
15
4
10
20
17b
3
5
8
2
17c
17
22
17a

PARKING LOCKING STATE

UNLOCKING STATE

ACCELERATOR PEDAL
37
38
BRAKE PEDAL
32
33
LOCKING MECHANISM MANIPULATION UNIT
34
DETECTION UNIT
35
ECU
31
TRAVELING CONTROL UNIT
31a
VARIOUS CONTROLS UNIT
31b
DETERMINATION UNIT
39
MEMORY
THRESHOLD
⋮
45
BRAKING FORCE INCREASE UNIT
46
ABNORMALITY NOTIFICATION UNIT
47
INVERTER UNIT
36
36a
36b
ELECTRIC MOTOR UNIT
2
BRAKING FORCE APPLYING MECHANISM
4
LINEAR SOLENOID
30
50
LOCK PIN
29
OUTPUT UNIT
49
48
5

ELECTRIC BRAKE ACTUATOR WITH PARKING FUNCTION

CROSS REFERENCE TO THE RELATED APPLICATION

This application is a continuation application, under 35 U.S.C. §111(a), of international application No. PCT/JP2013/078167, filed Oct. 17, 2013, which is based on and claims Convention priority to Japanese patent application No. 2012-235295, filed Oct. 25, 2012, the entire disclosure of which is herein incorporated by reference as a part of this application.

BACKGROUND OF THE INVENTION

Field of the Invention

The present invention relates to an electric brake actuator with a parking function which includes a locking mechanism for parking.

Description of Related Art

Hitherto, as an electric brake device, various electric brake devices including a so-called parking brake locking mechanism for parking have been proposed (Patent Document 1). As shown in FIG. 8, the parking brake locking mechanism includes: a ratchet 101 provided on an outer peripheral surface of a motor unit rotor 100; a swing arm 103 having, at its leading end, a locking pawl 102 which is engageable with and disengageable from the ratchet 101; a torsion spring 104 which biases the locking pawl 102 in a direction in which the locking pawl 102 is disengaged and released from the ratchet 101; and a solenoid 105 which moves the locking pawl 102 in a direction in which the locking pawl 102 is engaged with the ratchet 101.

RELATED DOCUMENT

Patent Document

[Patent Document 1] JP Laid-open Patent Publication No. 2006-183809

In the conventional electric brake device, for example, a malfunction may occur due to mechanical wear, deterioration of sliding characteristics, poor engagement, or the like of the parking brake locking mechanism, and thus it may be not possible to complete a parking lock operation. Therefore, the present applicant has proposed a technique to determine whether a parking lock operation has been completed, by detecting a displacement of a solenoid which is a drive source of a parking locking mechanism (JP Patent Application No. 2012-098521). However, after completion of a parking operation, for example, a vehicle may undesirably move due to a steep slope. In the case where a sensor or the like for determining whether a parking lock operation has been completed is newly added to an electric brake device, the number of components increases, and the manufacturing cost also increases.

SUMMARY OF THE INVENTION

An object of the present invention is to provide an electric brake actuator with a parking function which is able to more assuredly maintain a parking locking state and is able to achieve cost reduction.

An electric brake actuator with a parking function according to the present invention includes:

an electric motor unit 2;

a braking force applying mechanism 4 configured to apply a braking force to a wheel 52 in accordance with an output of the electric motor unit 2;

a locking mechanism 5 including an actuator 30 configured to drive the locking mechanism 5 to switch between a parking locking state in which the braking force of the braking force applying mechanism 4 is inhibited from becoming loose and an unlocking state in which the braking force is permitted to become loose;

a detection unit 35 provided in a vehicle in which the electric brake actuator is provided, the detection unit 35 being capable of detecting movement of the vehicle from a stop state; and a determination unit 39 configured to determine whether the locking mechanism 5 has shifted to the parking locking state, by using a detection signal outputted from the detection unit 35, when the locking mechanism 5 is driven by the actuator 30 so as to switch from the unlocking state to the parking locking state.

According to this configuration, during traveling of the vehicle, the locking mechanism 5 is previously set in the unlocking state, and by driving the electric motor unit 2, the braking force applying mechanism 4 applies a braking force to the wheel 52. During stoppage or parking, by switching the locking mechanism 5 to the parking locking state in a state where the braking force applying mechanism 4 is applying a braking force to the wheel 52, the vehicle is inhibited from undesirably moving. By setting the locking mechanism 5 in the parking locking state, the braking force is maintained even when the electric motor unit 2 is powered off.

When the locking mechanism 5 is driven to be switched as described above, the determination unit 39 determines whether the locking mechanism 5 has completely shifted to the parking locking state, by using the detection signal outputted from the detection unit 35 which is provided in the vehicle. The determination unit 39 uses the detection unit 35, which is able to detect movement of the vehicle from a stop state, and does not detect a displacement of the actuator itself, to determine whether or not the locking mechanism 5 has shifted to the parking locking state. Thus, even when the locking mechanism 5 is driven to be switched as described above, if the determination unit 39 determines that the locking mechanism 5 has not shifted to the parking locking state, it is possible to take measures of, for example, increasing the output of the electric motor unit 2. In addition, since the detection unit 35 is an existing component in the vehicle, it is possible to perform determination without newly adding, to the electric brake actuator, a sensor or the like for determining the parking locking state. Thus, it is possible to achieve cost reduction.

When the detection signal which is outputted from the detection unit 35 and changes in response to a movement speed or a movement distance of the vehicle is equal to or less than a threshold, the determination unit 39 may determine that the locking mechanism 5 has shifted to the parking locking state. The threshold is determined through an experiment, simulation, or the like. For example, when the vehicle is stopped on a slope having a determined inclination angle and the locking mechanism 5 is driven by the actuator 30 so as to switch from the unlocking state to the parking locking state, a detection signal generated when the vehicle starts moving is determined as the threshold.

The electric brake actuator may further include an abnormality notification unit 47 configured to send, to an output unit 49 provided in the vehicle, abnormality occurrence information indicating that an abnormality has occurred in the locking mechanism 5, when the determination unit 39 determines that the detection signal which is outputted from the detection unit 35 and changes in response to a movement speed or a movement distance of the vehicle is greater than a threshold. A driver is allowed to move away from the vehicle after confirming that abnormality occurrence information has not been sent to the output unit 49 after the parking locking state.

The electric brake actuator may further include a braking force increase unit 46 configured to increase the output of the electric motor unit 2 when the determination unit 39 determines that the detection signal which is outputted from the detection unit 35 and changes in response to a movement speed or a movement distance of the vehicle is greater than a threshold. When the detection signal from the detection unit 35 is greater than the threshold, the determination unit 39 determines that the locking mechanism 5 has not shifted to the parking locking state. If this state is left as it is, the vehicle may undesirably start moving. Thus, when a condition is met that the detection signal is greater than the threshold, the braking force increase unit 46 increases the output of the electric motor unit 2, whereby it is possible to increase the braking force with respect to the vehicle. Therefore, it is possible to prevent the vehicle from undesirably starting moving.

The detection unit 35 may include at least one of a sensor configured to detect rotation of the wheel 52 or 53, a sensor configured to detect nearness to another object, and a global positioning system sensor (GPS sensor). The determination unit 39 is able to determine the parking locking state by using such an existing sensor in the vehicle. For example, in the case where the sensor configured to detect rotation of the wheel 52 or 53 is used, when the locking mechanism 5 is driven by the actuator 30 so as to switch from the unlocking state to the parking locking state, if the determination unit 39 detects rotation of the wheel 52 or 53 on the basis of a detection signal from the sensor, the determination unit 39 determines that the vehicle has started moving, that is, the locking mechanism 5 has not shifted to the parking locking state.

The vehicle may include an electric motor unit 54 as a drive source. The vehicle may include a rotation angle sensor configured to detect a rotation angle of the electric motor unit 54, as the detection unit 35. The detection unit 35 may detect movement of the vehicle from a stop state by detecting a counter electromotive voltage or a counter electromotive force of the electric motor unit 54.

An automobile of the present invention includes any of the above-described electric brake actuators with the parking function. The automobile allows the parking locking state to be more assuredly maintained and also allows the cost of the entire vehicle to be reduced.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which the scope is to be determined by the appended claims. In the accompanying drawings, like reference numerals are used to denote like parts throughout the several views, and:

DESCRIPTION OF EMBODIMENTS

An electric brake actuator with a parking function according to a first embodiment of the present invention will be described with reference to FIG. 1 to FIG. 6. The electric brake actuator according to the embodiment serves both as a service brake to be used mainly during operation of a vehicle, such as an automobile, and as a parking brake to be used during stoppage of the vehicle. When a locking mechanism described later has not shifted to a parking locking state, the electric brake actuator can be used as the service brake.

Figure 1:
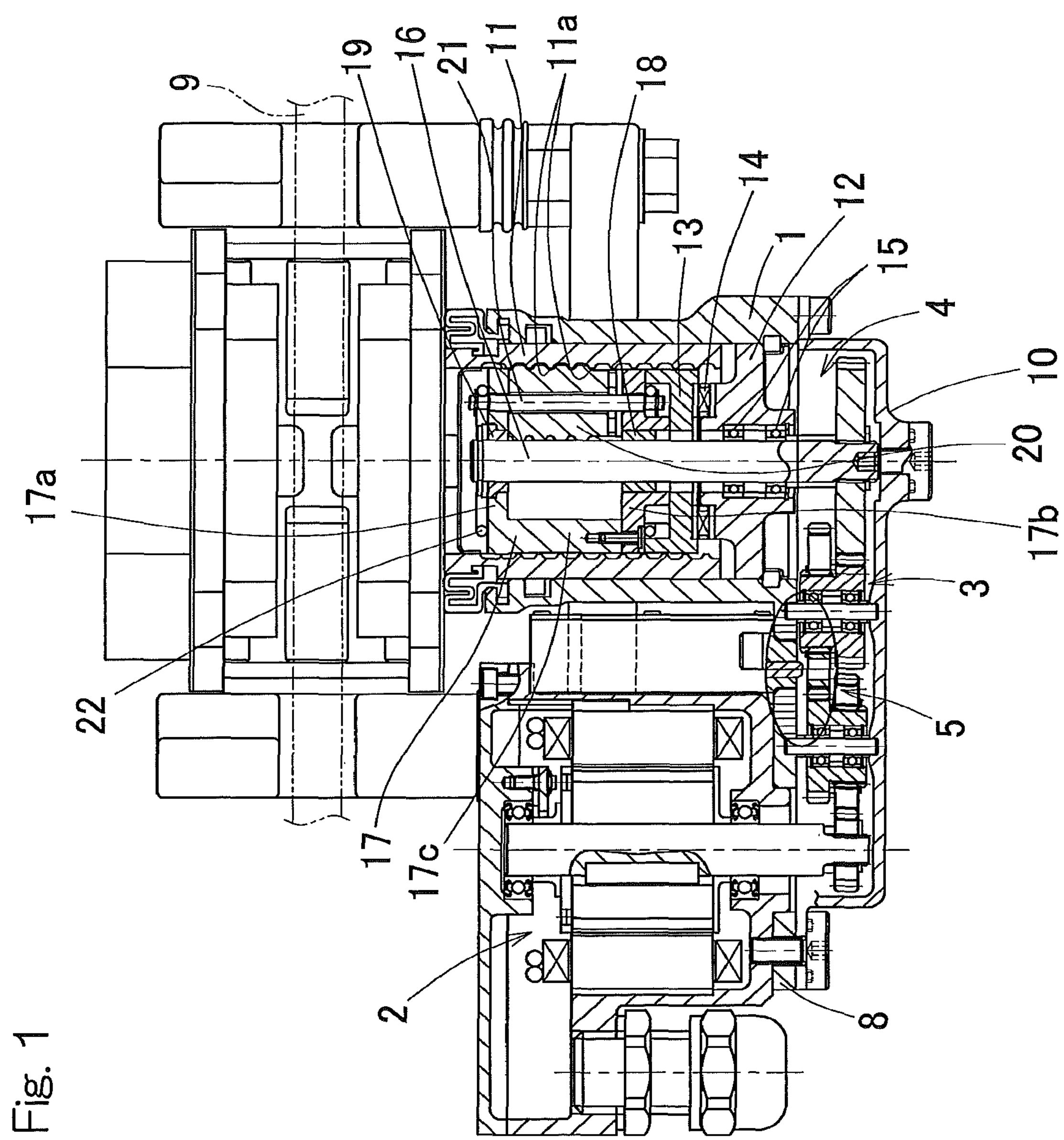
FIG. 1 is a cross-sectional view of an electric brake actuator with a parking function according to a first embodiment of the present invention.

As shown in FIG. 1, the electric brake actuator includes a housing 1, an electric motor unit 2, a speed reduction mechanism 3 configured to reduce the speed of rotation of the electric motor unit 2, a braking force applying mechanism 4, and a locking mechanism 5. A base plate 8 is provided at an opening end of the housing 1 so as to extend radially outward, and the electric motor unit 2 is supported by the base plate 8. The braking force applying mechanism 4 which applies a braking force to a wheel, in this example, to a brake disc 9 is incorporated in the housing 1. The braking force applying mechanism 4 is driven by an output of the electric motor unit 2. The opening end of the housing 1 and an outer surface of the base plate 8 are covered with a cover 10.

The braking force applying mechanism 4 will be described. The braking force applying mechanism 4 is a so-called linear motion mechanism configured to convert a rotation motion outputted by the speed reduction mechanism 3 to a linear motion and apply a braking force to the wheel. The braking force applying mechanism 4 includes a slide member 11, a bearing member 12, an annular thrust plate 13, a thrust bearing 14, rolling bearings 15, 15, a rotation shaft 16, a carrier 17, and first and second slide bearings 18, 19. The slide member 11 having a cylindrical shape is supported on an inner peripheral surface of the housing 1 such that rotation thereof is prevented and the slide member 11 is movable in the axial direction. A helical projection 11*a* is provided on an inner peripheral surface of the slide member

11 so as to project radially inward by a predetermined distance and to be helically formed. A plurality of planetary rollers described later are in mesh with the helical projection 11*a*.

The bearing member 12 is provided at one end side of the slide member 11 in the axial direction within the housing 1. The bearing member 12 includes: a flange portion extending radially outward; and a boss portion. The rolling bearings 15, 15 are fitted in the boss portion, and the rotation shaft 16 is fitted in inner diameter surfaces of inner rings of the respective bearings 15, 15. Thus, the rotation shaft 16 is rotatably supported by the bearing member 12 via the bearings 15, 15.

The carrier 17 is provided on the inner periphery of the slide member 11 so as to be rotatable about the rotation shaft 16. The carrier 17 includes a first disc 17*a* and a second disc 17*b* which are opposed to each other in the axial direction. The second disc 17*b* which is close to the bearing member 12 may hereinafter be referred to as an inner side disc 17*b*, and the first disc 17*a* which is distant from the bearing member 12 may hereinafter be referred to as an outer side disc 17*a*. An interval adjustment member 17*c* is provided on a principal surface facing the second disc 17*b*, of two principal surfaces of the first disc 17*a*, so as to project in the axial direction from an outer peripheral edge portion of this principal surface. A plurality of the interval adjustment members 17*c* are provided so as to be spaced apart from each other in a circumferential direction for adjusting the respective intervals between a plurality of planetary rollers 20. The first and second discs 17*a*, 17*b* are provided integrally by these interval adjustment members 17*c*.

The second disc 17*b* is supported by the first slide bearing 18 fitted between the second disc 17*b* and the rotation shaft 16, such that the second disc 17*b* is rotatable and is movable in the axial direction. The first disc 17*a* has a shaft insertion hole formed at a center portion thereof, and the second slide bearing 19 is fitted in this shaft insertion hole. The first disc 17*a* is supported by the second slide bearing 19 so as to be rotatable about the rotation shaft 16. A washer for receiving a thrust load is fitted on an end portion of the rotation shaft 16, and a retaining ring for preventing the washer from slipping off is provided at the end portion.

The carrier 17 is provided with a plurality of roller shafts 21 spaced apart from each other in the circumferential direction. Both end portions of each roller shaft 21 are supported by the first and second discs 17*a*, 17*b*, respectively. That is, the first and second discs 17*a*, 17*b* each have a plurality of shaft insertion holes each formed as a prolonged hole, and both end portions of each roller shaft 21 are inserted into each pair of the shaft insertion holes of the first and second discs 17*a*, 17*b*, so that the roller shafts 21 are supported so as to be movable in the radial direction. An elastic ring 22 is provided around all the roller shafts 21 so as to bias these roller shafts 21 radially inward.

The planetary roller 20 is rotatably supported by each roller shaft 21, and each planetary roller 20 is provided between an outer peripheral surface of the rotation shaft 16 and the inner peripheral surface of the slide member 11. Each planetary roller 20 is pressed against the outer peripheral surface of the rotation shaft 16 by a biasing force of the elastic ring 22 which is provided around all the roller shafts 21. When the rotation shaft 16 rotates, each planetary roller 20 which is in contact with the outer peripheral surface of the rotation shaft 16 rotates due to contact friction therebetween. A helical groove is formed on an outer peripheral surface of each planetary roller 20 and is in mesh with the helical projection 11*a* of the slide member 11. A washer and a thrust bearing (both are not shown) are provided between the second disc 17*b* of the carrier 17 and one end portion of each planetary roller 20 in the axial direction. Within the housing 1, the annular thrust plate 13 and the thrust bearing 14 are provided between the second disc 17*b* and the bearing member 12.

Figure 2:
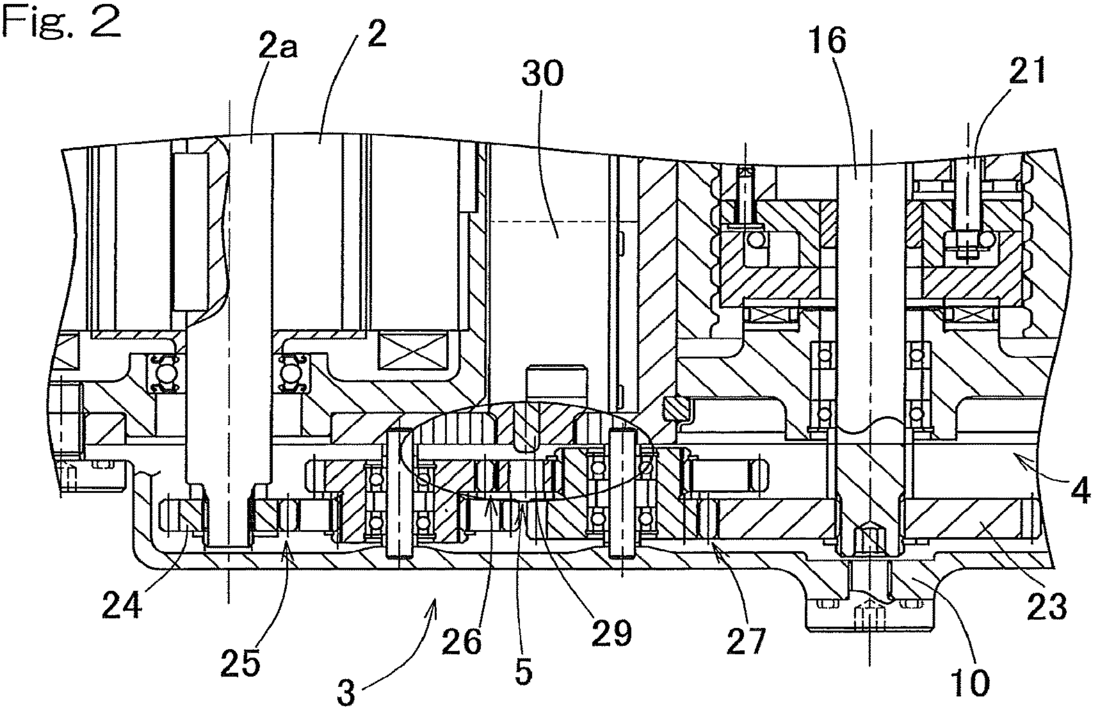
FIG. 2 is an enlarged cross-sectional view of a speed reduction mechanism of the electric brake actuator.

The speed reduction mechanism 3 will be described. As shown in FIG. 2, the speed reduction mechanism 3 is a mechanism configured to reduce the speed of rotation of the electric motor unit 2 and to transmit the rotation to an output gear 23 fixed to the rotation shaft 16, and includes a plurality of gear trains. In this example, the speed reduction mechanism 3 is able to reduce the speed of rotation of an input gear 24, which is mounted on a rotor shaft 2*a* of the electric motor unit 2, sequentially via first, second, and third gear trains 25, 26, and 27 and transmit the rotation to the output gear 23 which is fixed to an end portion of the rotation shaft 16.

Figure 3:
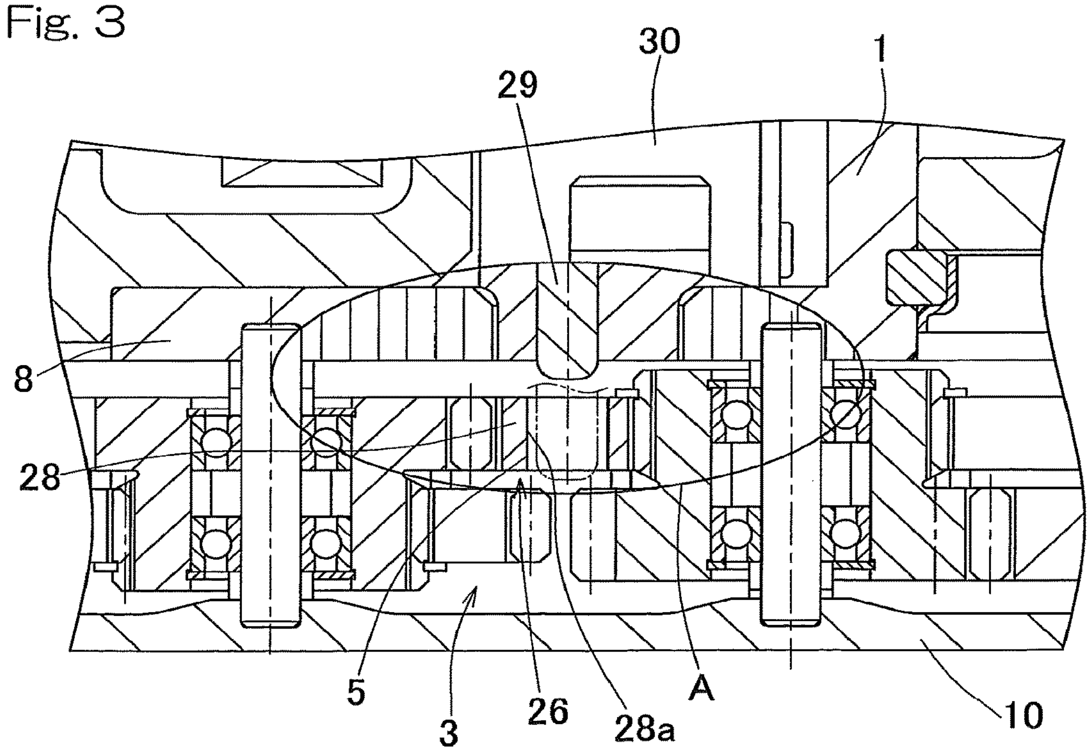
FIG. 3 is an enlarged cross-sectional view of a locking mechanism of the electric brake actuator.
Figure 4A:
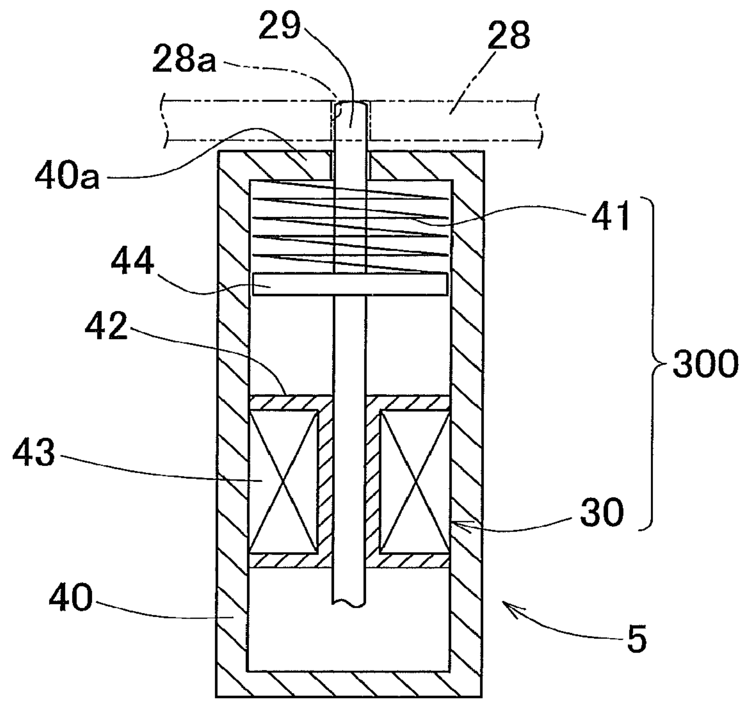
FIG. 4A is a diagram schematically showing the locking mechanism which is set in a parking locking state.

The locking mechanism 5 will be described. As shown in FIG. 3, the locking mechanism 5 is configured to be switchable between a parking locking state in which the braking force of the braking force applying mechanism 4 (FIG. 2) is prevented from becoming loose (decreasing) and an unlocking state in which the braking force is permitted to become loose. In an ellipse line A in FIG. 3, the parking locking state of the locking mechanism 5 is represented by a double dotted line, and the unlocking state of the locking mechanism 5 is represented by a solid line. The locking mechanism 5 is provided in the speed reduction mechanism 3. As shown in FIG. 4A, the locking mechanism 5 includes a casing 40, a lock pin 29, and a drive unit 300. The drive unit 300 includes: biasing member 41 biasing the lock pin 29 to an unlocking state; and an actuator including a linear solenoid 30. The casing 40 is supported by the base plate 8 (FIG. 3), and the base plate 8 has a pin hole which permits the lock pin 29 to advance and retract therethrough.

The linear solenoid 30 is provided within the casing 40 and includes a coil bobbin 42 and a coil 43 wound on the coil bobbin 42. A portion of the lock pin 29 which is composed of an iron core is slidably provided in a hole of the coil bobbin 42. Within the casing 40, a flange-shaped spring receiving member 44 is fixed to an intermediate portion of the lock pin 29 in a longitudinal direction thereof. The casing 40 is provided with a base end portion 40*a* having a through hole which permits the lock pin 29 to advance and retract therethrough. Within the casing 40, the biasing member 41 composed of a compression coil spring is provided between the base end portion 40*a* and the spring receiving member 44.

Figure 4B:
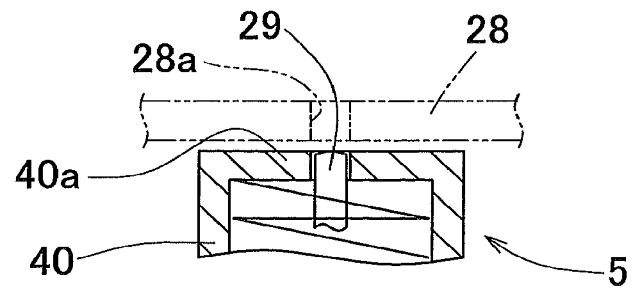
FIG. 4B is a diagram schematically showing the locking mechanism which is set in an unlocking state.

The lock pin 29 is switchable between a parking locking state (parking locking position) shown in FIG. 4A and an unlocking state (unlocking position) shown in FIG. 4B. That is, as shown in FIG. 3, an intermediate gear 28 at an output side of the second gear train 26 has a plurality of locking holes 28*a* formed at regular intervals in the circumferential direction. The lock pin 29 is provided such that the lock pin 29 is able to advance and retract with respect to one point on a pitch circle on which the locking holes 28*a* are arranged, by the linear solenoid 30 which is an actuator for pin drive. When the lock pin 29 is in the unlocking state shown in FIG. 4B, if the linear solenoid 30 is electrically energized, the linear solenoid 30 drives and switches the lock pin 29 to the parking locking state against the biasing force of the biasing member 41 as shown in FIG. 4A. That is, the lock pin 29 is moved to the parking locking position by the linear solenoid 30.

By the linear solenoid 30 driving the lock pin 29, the lock pin 29 advances and is engaged with the locking hole 28*a* to inhibit rotation of the intermediate gear 28, thereby setting the locking mechanism 5 in the parking locking state. When the electrical energization of the linear solenoid 30 is halted, the spring receiving member 44 is pressed down to the bottom side within the casing 40 by the biasing force of the biasing member 41. Accordingly, the lock pin 29 is caused to retract into the casing 40 to be released from the locking hole 28*a* to permit rotation of the intermediate gear 28, whereby the locking mechanism 5 can be set in the unlocking state. However, when the electric motor unit 2 is powered off, the braking force applying mechanism 4 and the speed reduction mechanism 3 are rotated in a direction in which the braking force decreases, by a pressing reactive force of the braking force. Thus, a frictional force occurs between the lock pin 29 and an inner diameter surface of the locking hole 28*a*, so that the locking mechanism 5 cannot be switched to the unlocking state. However, by a parking brake releasing operation or the like, the electric motor unit 2 applies a braking force once, whereby the frictional force is released, so that the locking mechanism 5 is switched to the unlocking state.

Figure 5:
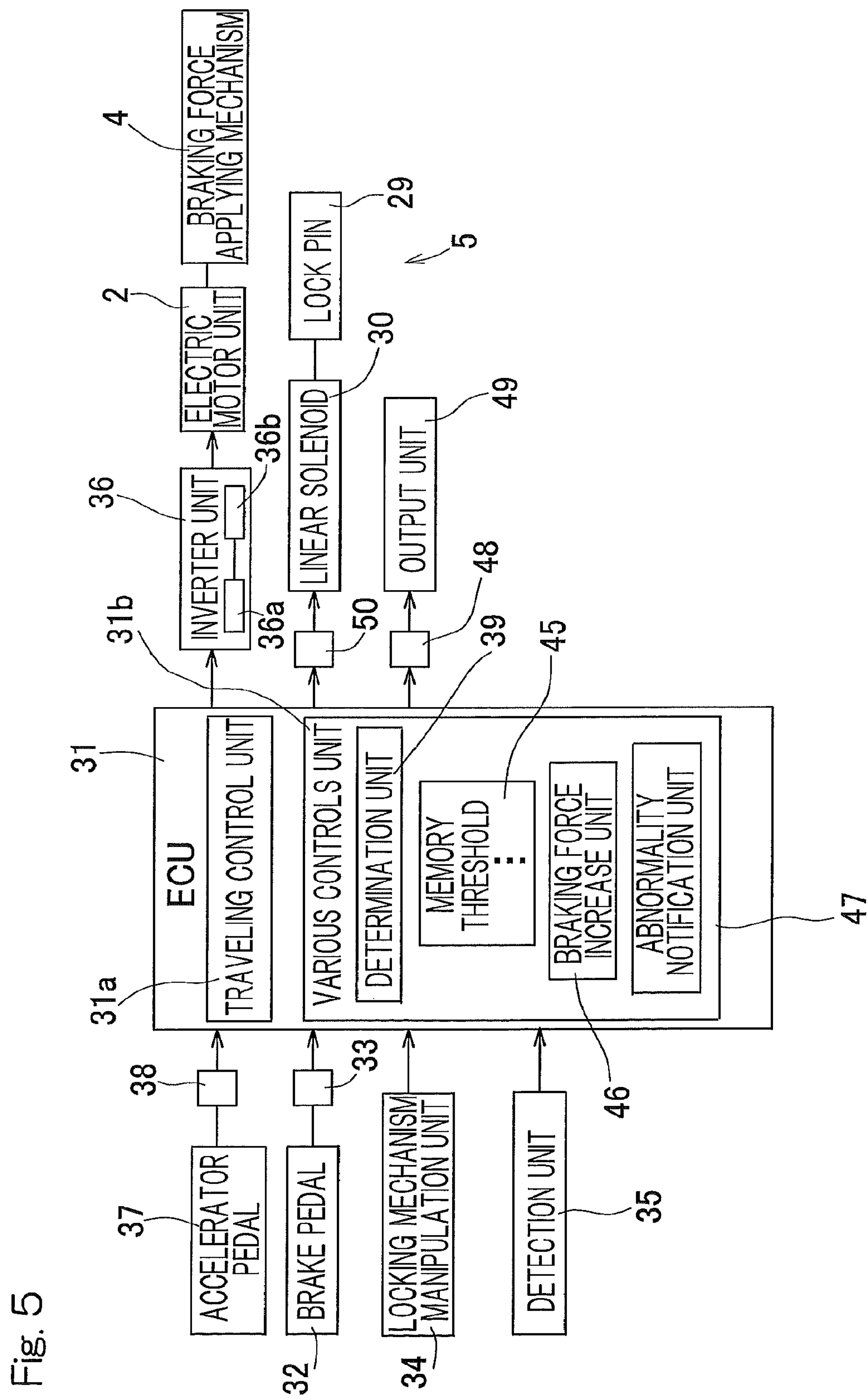
FIG. 5 is a block diagram of a control system of the electric brake actuator.

FIG. 5 is a block diagram of a control system of the electric brake actuator. As shown in FIG. 5, the vehicle is provided with an ECU 31 which is an electronic control unit configured to execute general control of the vehicle and a detection unit 35 (described later) capable of detecting movement of the vehicle from a stop state. The ECU 31 includes a traveling control unit 31*a* and a various controls unit 31*b* as main units. The traveling control unit 31*a* generates an accelerating/decelerating command on the basis of an accelerating command outputted from an accelerator depression amount sensor 38 in response to an amount by which an accelerator pedal 37 is depressed or pressed down and a decelerating command outputted from a brake operation amount sensor 33 in response to an amount by which a brake pedal 32 is operated or depressed.

To the ECU 31, an inverter unit 36 is connected. The inverter unit 36 includes a power circuitry 36*a* provided for each electric motor unit 2 and a motor unit control circuitry 36*b* to control the power circuitry 36*a*. The motor unit control circuitry 36*b* includes a computer, programs to be executed by the computer, and electronic circuits. The motor unit control circuitry 36*b* receives the accelerating/decelerating command from the traveling control unit 31*a*, converts the accelerating/decelerating command to a current command, and sends the current command to a PWM driver of the power circuitry 36*a*.

A locking mechanism manipulation unit 34 corresponds to an input unit for an operation of the parking brake by a driver. When the driver performs an operation or manipulates so as to operate the parking brake, the locking mechanism manipulation unit 34 sends an operation command to set the locking mechanism 5 in the parking locking state. On the other hand, when the driver performs an operation so as to release the parking brake, the locking mechanism manipulation unit 34 sends an operation command to set the locking mechanism 5 in the unlocking state.

The detection unit 35 includes, for example, at least any one of a rotation angle sensor, an angular velocity sensor, a magnetic sensor, a resolver, a Hall IC, an encoder, an ABS sensor, a GPS sensor, a collision prevention sensor, and an obstacle sensor. The rotation angle sensor mainly detects rotation of the wheel or an axle, and the angular velocity sensor detects an angle movement amount of a part of a vehicle body per unit time, that is, an angular velocity thereof. The magnetic sensor, which utilizes magnetism and is mainly used as a rotation sensor, is used for detecting rotation of an electric motor unit that drives the vehicle. Each of the resolver, the Hall IC, and the encoder detects a rotation angle of a rotor shaft which is a component of the electric motor unit that drives the vehicle. The ABS sensor detects rotation of a wheel. The global positioning system sensor (abbreviated as GPS) detects movement of the position of the vehicle on the basis of a displacement of the coordinate of latitude/longitude. The collision prevention sensor detects approach of the vehicle to another vehicle or the like when the vehicle starts moving. The obstacle sensor detects approach of the vehicle to an obstacle when the vehicle starts moving.

The various controls unit 31*b* includes determination unit 39, a memory 45, braking force increase unit 46, and abnormality notification unit 47. When the locking mechanism 5 is driven by the linear solenoid 30 so as to switch from the unlocking state to the parking locking state, the determination unit 39 determines whether or not the locking mechanism 5 has shifted to the parking locking state, by using a detection signal outputted from the detection unit 35. In the case where, for example, the rotation angle sensor is used as the detection unit 35, when the locking mechanism 5 is driven by the linear solenoid 30 so as to switch to the parking locking state, if the determination unit 39 detects rotation of the wheel or the like outputted from the rotation angle sensor, the determination unit 39 determines that the locking mechanism 5 has not shifted to the parking locking state and the vehicle has undesirably started moving.

The memory 45 is composed of, for example, a ROM or the like, and rewritably stores a threshold which is to be compared to a detection signal which is outputted from the detection unit 35 and changes in response to a movement speed or a movement distance of the vehicle. At the time of the determination by the determination unit 39, the threshold is read from the memory 45 and used. When a rotational frequency of the wheel or the like outputted from the rotation angle sensor is greater than the threshold, the determination unit 39 determines that the locking mechanism 5 has not shifted to the parking locking state. On the other hand, when the rotational frequency is equal to or less than the threshold, the determination unit 39 determines that the locking mechanism 5 has shifted to the parking locking state. Through an experiment, simulation, or the like, a detection signal (a signal indicating a rotational frequency or number of revolutions in this example) generated when a vehicle starts moving in a state where the vehicle is stopped at a determined inclination angle is obtained as the threshold properly.

When the determination unit 39 determines that the detection signal which is outputted from the detection unit 35 and changes in response to the movement speed or the movement distance of the vehicle is greater than the threshold, the braking force increase unit 46 increases the output of the electric motor unit 2. That is, when the detection signal from the detection unit 35 is greater than the threshold, the determination unit 39 determines that the locking mechanism 5 has not shifted to the parking locking state. If this state is left as it is, the vehicle may undesirably start moving. Thus, when a condition is met that the detection signal is greater than the threshold, the braking force increase unit 46 increases the output of the electric motor unit 2 to increase the braking force with respect to the vehicle, whereby it is possible to prevent the vehicle from undesirably starting moving.

In addition, when the determination unit 39 determines that the detection signal outputted from the detection unit 35 is greater than the threshold, the abnormality notification unit 47 sends abnormality occurrence information (a parking abnormality warning) indicating that an abnormality has occurred in the locking mechanism 5, via a drive circuit 48 to an output unit 49 provided in the vehicle. The output unit 49 may be, for example, an warning lamp or a display unit such as a display through which the driver of the vehicle can visually recognize the abnormality occurrence information, or a sound output unit configured to output a sound such as a warning sound.

Figure 6:
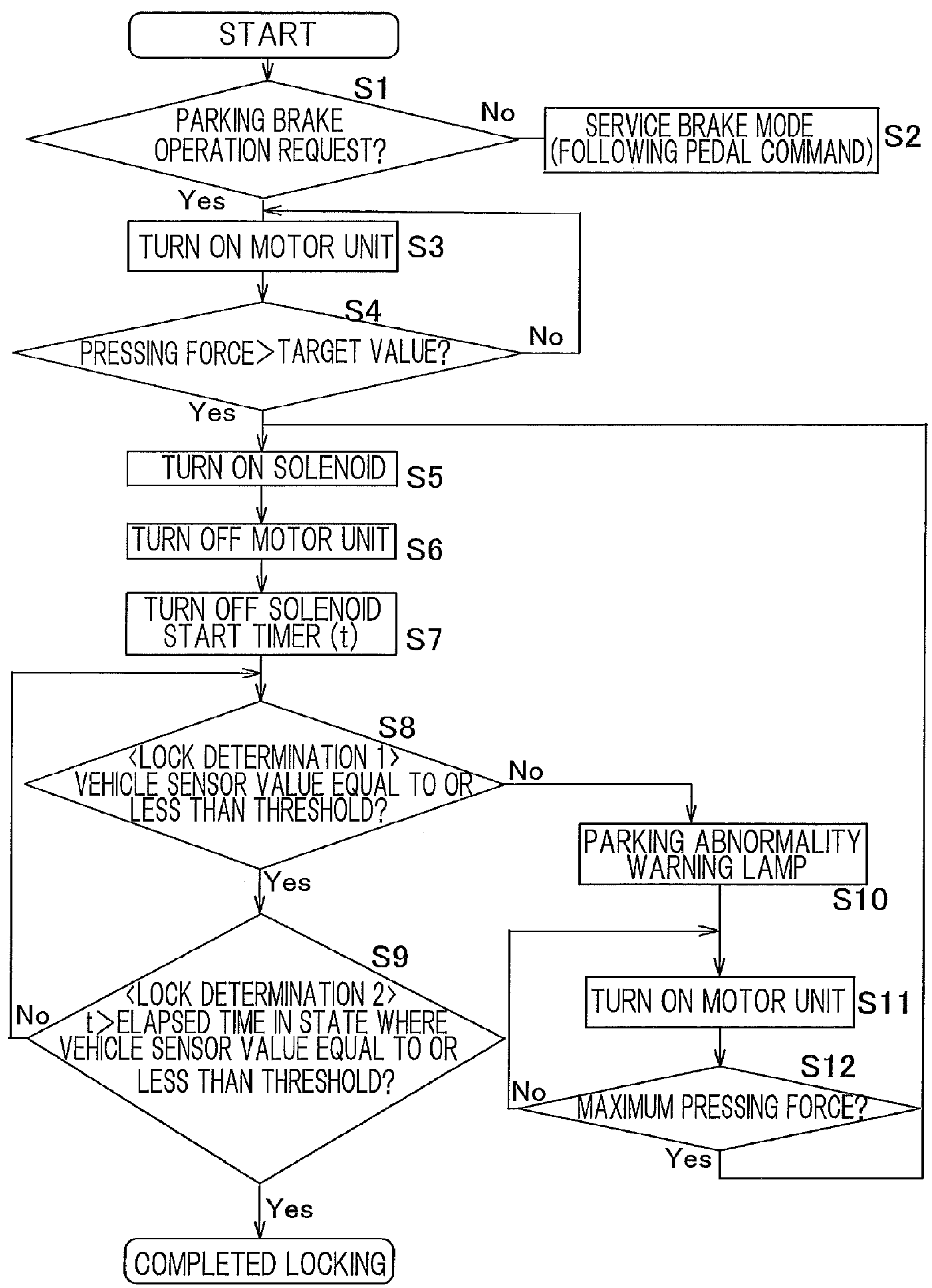
FIG. 6 is a flowchart showing a method for controlling the electric brake actuator.

FIG. 6 is a flowchart showing an outline of a method for controlling the electric brake actuator. Processes thereof will be described with reference to FIGS. 5 and 6. For example, the process starts in a state where the vehicle is at stoppage. After the process starts, the ECU 31 determines whether or not a request for operating the parking brake has been made (step S1). When the parking brake is not to be operated (step S1; No), the mode shifts to a service brake mode in which the service brake is used (step S2). In this case, a current which follows a decelerating command outputted from the brake operation amount sensor 33 in response to an amount by which the brake pedal 32 is operated, is supplied to the electric motor unit 2.

When the parking brake is operated by the driver or the like, the ECU 31 determines that a request for operating the parking brake has been made (step S1; Yes), powers on the electric motor unit 2, and supplies a current to the electric motor unit 2 (step S3). Subsequently, the determination unit 39 of the ECU 31 determines whether or not a braking force (pressing force) acting on the brake disc of the braking force applying mechanism 4 is greater than a target value (step S4). When it is determined that the pressing force is equal to or less than the target value (step S4; No), the process returns to step S3. When it is determined the pressing force is greater than the target value (step S4; Yes), the process advances to step S5.

In step S5, the ECU 31 turns on the linear solenoid 30 via a drive circuit 50. Accordingly, the linear solenoid 30 drives and switches the lock pin 29 to the parking locking state. Subsequently, the ECU 31 powers off the electric motor unit 2 (step S6). Then, the ECU 31 turns off the linear solenoid 30, and starts a timer for executing a lock determination after a predetermined time (e.g., several milliseconds) elapses from the time when the ECU 31 turns off the linear solenoid 30 (step S7). Since the electric motor unit 2 is powered off once in step S6, the braking force applying mechanism 4 and the speed reduction mechanism 3 (FIG. 1) are rotated in the direction in which the braking force decreases, by the pressing reaction force of the braking force. Thus, a frictional force occurs between an outer peripheral surface of the lock pin 29 and the inner diameter surface of the locking hole 28*a* (FIG. 3). Therefore, even when the linear solenoid 30 is turned off in step S7, the locking mechanism 5 is able to maintain the parking locking state.

After a time determined by the timer in step S7 elapses, the determination unit 39 determines whether or not the detection signal outputted from the detection unit 35 is equal to or less than the threshold (lock determination 1: step S8). When the detection signal is equal to or less than the threshold (step S8; Yes), the determination unit 39 starts a timer for confirming how much a time (e.g., several milliseconds to several minutes) has elapsed in a state where the detection signal is equal to or less than the threshold (step S9). When it is determined that the determined time has elapsed in the state where the detection signal is equal to or less than the threshold (step S9; Yes), the determination unit 39 determines that shift of the locking mechanism 5 to the parking locking state has been completed, and ends the process. When it is determined that the determined time has not elapsed in the state where the detection signal is equal to or less than the threshold (step S9; No), the process returns to step S8.

When it is determined in step S8 that the detection signal is not equal to or less than the threshold (step S8; No), the abnormality notification unit 47 sends abnormality occurrence information to the output unit 49 (step S10). Subsequently, the ECU 31 powers on the electric motor unit 2, and the braking force increase unit 46 increases the output of the electric motor unit 2 (step S11). If the pressing force of the braking force applying mechanism 4 has not reached a maximum pressing force (step S12; No), the process returns to step S11, and if the pressing force of the braking force applying mechanism 4 has reached the maximum pressing force (step S12; Yes), the process returns to step S5.

Advantageous operational effects will be described. During traveling of the vehicle, the locking mechanism 5 is previously set in the unlocking state, and by driving the electric motor unit 2, the braking force applying mechanism 4 applies a braking force to the wheel. During stoppage or parking, by switching the locking mechanism 5 to the parking locking state in a state where the braking force applying mechanism 4 is applying a braking force to the wheel, the vehicle is inhibited from undesirably moving. By setting the locking mechanism 5 in the parking locking state, the braking force is maintained even when the electric motor unit 2 is powered off.

When the locking mechanism 5 is driven and switched as described above, the determination unit 39 determines whether or not the locking mechanism 5 has completely shifted to the parking locking state, by using the detection signal outputted from the detection unit 35 which is provided in the vehicle. The determination unit 39 uses the detection unit 35, which is able to detect movement of the vehicle from a stop state and not to detect a displacement of the linear solenoid itself, to determine whether the locking mechanism 5 has shifted to the parking locking state. Thus, even when the locking mechanism 5 is driven and switched as described above, if the determination unit 39 determines that the locking mechanism 5 has not shifted to the parking locking state, it is possible to take measures of powering on the electric motor unit 2 and increasing the motor unit output.

For example, when a parking operation of the vehicle is performed on a steep slope, the vehicle may undesirably start moving if the vehicle is left as it is. Thus, when the condition is met that the detection signal from the detection unit 35 is greater than the threshold, the electric motor unit 2 is powered on and the motor unit output is increased, whereby it is possible to increase the braking force with respect to the vehicle. In addition, since the determination unit 39 confirms how much the time (e.g., several milliseconds to several minutes) has elapsed in the state where the detection signal is equal to or less than the threshold, it is possible to increase the braking force with respect to the vehicle even in a state where the driver is away from the vehicle. Thus, it is possible to temporarily inhibit the vehicle from undesirably moving.

In addition, since the detection unit 35 is an existing component in the vehicle, it is possible to perform determination without newly adding a sensor or the like for determining the parking locking state to the electric brake actuator. Thus, it is possible to achieve cost reduction. Since the abnormality notification unit 47 which sends abnormality occurrence information to the output unit 49 in the vehicle is provided, the driver is allowed to move away from the vehicle after confirming that abnormality occurrence information has not been sent to the output unit 49 after the parking locking state.

The vehicle may include an electric motor unit as a drive source. The vehicle may include a rotation angle sensor configured to detect a rotation angle of the electric motor unit, as the detection unit 35. The detection unit 35 may detect movement of the vehicle from a stop state by detecting a counter electromotive voltage or a counter electromotive force of the electric motor unit.

Figure 7:
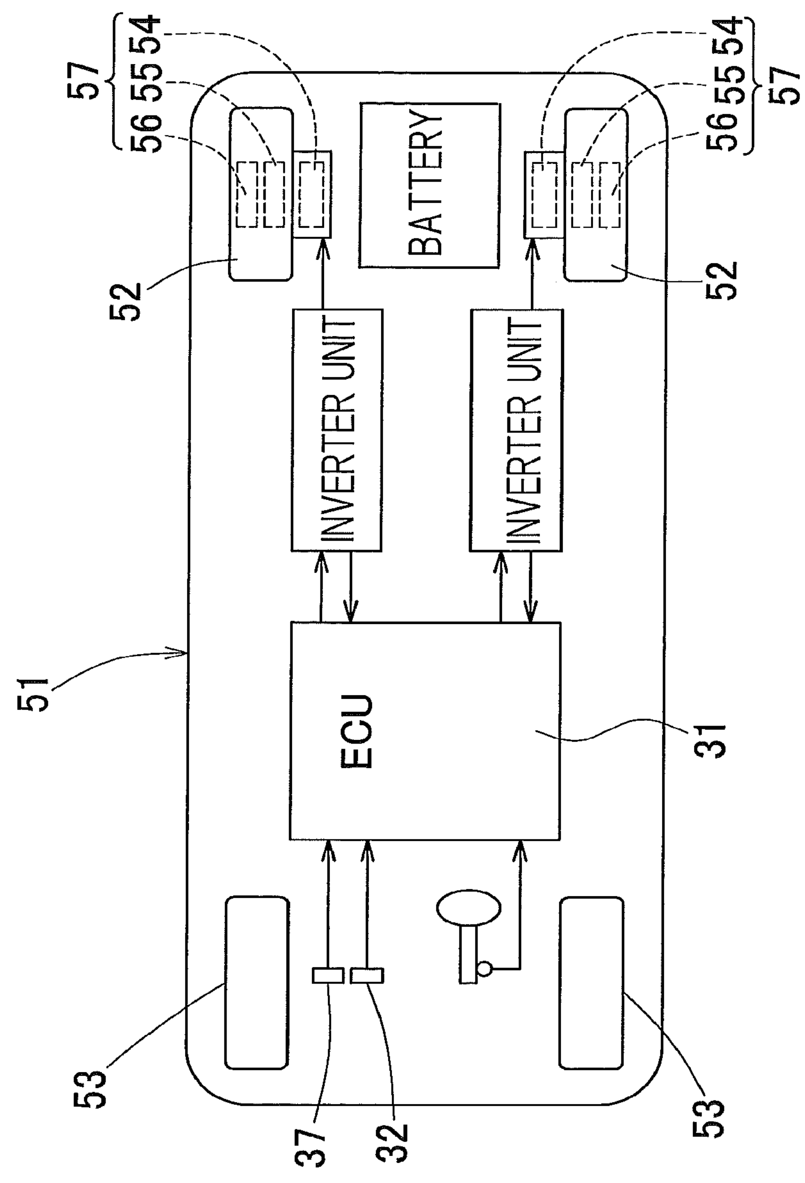
FIG. 7 is a diagram schematically showing an automobile equipped with the electric brake actuator according to any of embodiments of the present invention.
Figure 8:
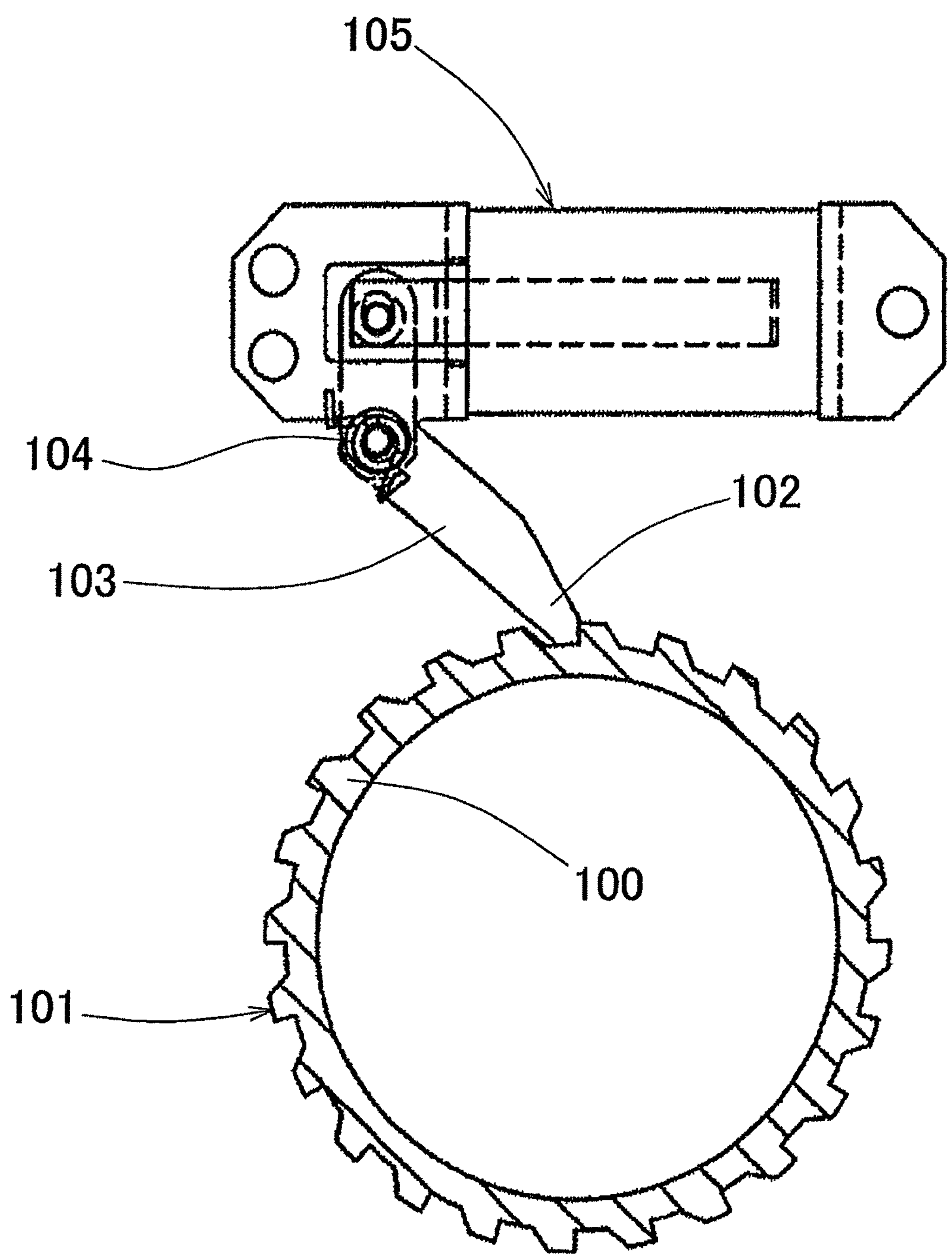
FIG. 8 is a schematic diagram schematically showing an operation state of a parking brake locking mechanism of a conventional example.

FIG. 7 is a diagram schematically showing an automobile equipped with any of the electric brake actuators described above. The automobile shown in FIG. 7 is an electric vehicle that includes electric motor units as drive sources, and is a four-wheel vehicle which includes a vehicle body 51 with left and right rear wheels 52 as drive wheels and with left and right front wheels 53 as driven wheels. The front wheels 53 are steered wheels. The left and right drive wheels 52, 52 are driven by independent traction drive sources 54 (motor units 54) respectively. Rotation of each motor unit 54 is transmitted to the wheel 52 via a reducer or a reduction gear 55 and a wheel bearing 56. The motor unit 54, the reduction gear 55, and the wheel bearing 56 are integrally assembled into an in-wheel motor drive unit 57. The in-wheel motor drive unit 57 is partly or entirely disposed within the wheel 52 with the motor unit 54 being disposed near the wheel 52. Each of the wheels 52, 53 is provided with a brake which is not shown.

According to the automobile equipped with any of the aforementioned electric brake actuators, it is possible to more assuredly maintain the parking locking state and reduce the cost of the entire vehicle.

Additionally, a hybrid vehicle that includes a pair of left and right front wheels as main drive wheels driven by an engine and a pair of left and right rear wheels as auxiliary drive wheels driven by a vehicle motor drive unit may be equipped with any of the aforementioned electric brake actuators. A so-called single-motor unit-type electric vehicle that includes a vehicle motor drive unit to drive wheels by transmitting rotation of a motor unit to an axle via a gear may be equipped with any of the aforementioned electric brake actuators. An automobile driven by only an engine may be equipped with any of the aforementioned electric brake actuators. Wheels to which any of the electric brake actuators is provided may be front wheels, rear wheels, or four wheels.

Although the preferred embodiments have been described above with reference to the accompanying drawings, those skilled in the art will readily conceive numerous changes and modifications within the framework of obviousness upon the reading of the specification herein of the present invention. Accordingly, such changes and modifications are to be construed as included in the scope of the present invention as delivered from the claims annexed hereto.

REFERENCE NUMERALS

2 . . . electric motor unit
4 . . . braking force applying mechanism
5 . . . locking mechanism
30 . . . linear solenoid (actuator)
35 . . . detection unit
39 . . . determination unit
46 . . . braking force increase unit
47 . . . abnormality notification unit
52 . . . wheel

What is claimed is:

1. An electric brake actuator with a parking function, comprising:
an electric motor unit;
a braking force applying mechanism configured to apply a braking force to a wheel in accordance with an output of the electric motor unit;
a locking mechanism including an actuator configured to drive the locking mechanism to switch between a parking locking state in which the braking force of the braking force applying mechanism is inhibited from becoming loose and an unlocking state in which the braking force is permitted to become loose;
a detection unit provided in a vehicle in which the electric brake actuator is provided, the detection unit being capable of detecting movement of the vehicle from a stop state; and
a determination unit configured to determine whether the locking mechanism has shifted to the parking locking state, by using a detection signal outputted from the detection unit, when the locking mechanism is driven by the actuator so as to switch from the unlocking state to the parking locking state,
wherein, when the detection signal which is outputted from the detection unit and changes in response to a movement speed or a movement distance of the vehicle is equal to or less than a threshold, the determination unit determines that the locking mechanism has shifted to the parking locking state.

2. The electric brake actuator with the parking function as claimed in claim 1, further comprising an abnormality notification unit configured to send, to an output unit provided in the vehicle, abnormality occurrence information indicating that an abnormality has occurred in the locking mechanism, when the determination unit determines that the detection signal which is outputted from the detection unit and changes in response to a movement speed or a movement distance of the vehicle is greater than the threshold.

3. The electric brake actuator with the parking function as claimed in claim 1, wherein the detection unit includes at least one of a sensor configured to detect rotation of the wheel, a sensor configured to detect nearness to another object, and a global positioning system sensor.

4. An electric brake actuator with a parking function, comprising:
an electric motor unit;
a braking force applying mechanism configured to apply a braking force to a wheel in accordance with an output of the electric motor unit;
a locking mechanism including an actuator configured to drive the locking mechanism to switch between a parking locking state in which the braking force of the braking force applying mechanism is inhibited from becoming loose and an unlocking state in which the braking force is permitted to become loose;
a detection unit provided in a vehicle in which the electric brake actuator is provided, the detection unit being capable of detecting movement of the vehicle from a stop state;
a determination unit configured to determine whether the locking mechanism has shifted to the parking locking state, by using a detection signal outputted from the detection unit, when the locking mechanism is driven by the actuator so as to switch from the unlocking state to the parking locking state; and
a braking force increase unit configured to increase the output of the electric motor unit when the determination unit determines that the detection signal which is outputted from the detection unit and changes in response to a movement speed or a movement distance of the vehicle is greater than a threshold.

5. The electric brake actuator with the parking function as claimed in claim 4, further comprising an abnormality notification unit configured to send, to an output unit provided in the vehicle, abnormality occurrence information indicating that an abnormality has occurred in the locking mechanism, when the determination unit determines that the detection signal which is outputted from the detection unit and changes in response to a movement speed or a movement distance of the vehicle is greater than the threshold.

6. The electric brake actuator with the parking function as claimed in claim 4, wherein the detection unit includes at least one of a sensor configured to detect rotation of the wheel, a sensor configured to detect nearness to another object, and a global positioning system sensor.

* * * * *